(12) United States Patent
Mehta et al.

(10) Patent No.: US 7,918,956 B2
(45) Date of Patent: Apr. 5, 2011

(54) METHOD FOR MANUFACTURING AN INNER LINER FOR A STORAGE TANK

(75) Inventors: Saurin Mehta, Troy, MI (US); David Hill, Commerce Township, MI (US); James Edward Thompson, Novi, MI (US)

(73) Assignee: Inergy Automotive Systems Research (S.A.), Brussels (BE)

( * ) Notice: Subject to any disclaimer, the term of this patent is extended or adjusted under 35 U.S.C. 154(b) by 87 days.

(21) Appl. No.: 12/293,313

(22) PCT Filed: Mar. 26, 2007

(86) PCT No.: PCT/EP2007/052840
§ 371 (c)(1),
(2), (4) Date: Sep. 17, 2008

(87) PCT Pub. No.: WO2007/110399
PCT Pub. Date: Oct. 4, 2007

(65) Prior Publication Data
US 2009/0263315 A1    Oct. 22, 2009

Related U.S. Application Data

(60) Provisional application No. 60/786,716, filed on Mar. 29, 2006.

(30) Foreign Application Priority Data

Apr. 25, 2006   (EP) .................................... 06113077

(51) Int. Cl.
*F16L 13/02*   (2006.01)
(52) U.S. Cl. .................. 156/172; 156/304.2; 156/304.5; 220/581; 220/586
(58) Field of Classification Search .................. 156/172, 156/304.2, 304.5; 220/581, 586, 588, 589
See application file for complete search history.

(56) References Cited

U.S. PATENT DOCUMENTS 3,053,726 A * 9/1962 Larson et al. .............. 156/304.2
(Continued)

FOREIGN PATENT DOCUMENTS

DE          19937470 A1    2/2001
(Continued)

OTHER PUBLICATIONS

PCT International Search Report dated Sep. 10, 2007 for International Patent Application No. PCT/EP2007/052840 (4 pp.).

(Continued)

*Primary Examiner* — Jeff Aftergut
*Assistant Examiner* — David Simmons
(74) *Attorney, Agent, or Firm* — Oblon, Spivak, McClelland, Maier & Neustadt, L.L.P.

(57) ABSTRACT

A method for manufacturing a polymeric inner liner for a storage tank, particularly a hydrogen storage tank, comprising:
  providing a cylindrical body of polymer material, having a first open end and a first peripheral connection tab at the first open end, the cylindrical body comprising a structural layer and a barrier layer;
  providing a dome-shaped end cap of polymer material having a base with a cross-section essentially corresponding to a cross-section of the first open end of the cylindrical body and having a second peripheral connection tab at a peripheral end portion of such end cap;
  placing the end cap with its base onto the first open end of the cylindrical body and with the first and second peripheral tabs in contact with each other; and
  welding both peripheral connection tabs together.
A storage tank made using such liner. Use of such tank for storing hydrogen.

13 Claims, 2 Drawing Sheets

U.S. PATENT DOCUMENTS

| | | | |
|---|---|---|---|
| 3,508,677 A * | 4/1970 | Laibson et al. | 220/590 |
| 3,615,999 A * | 10/1971 | Basier et al. | 156/172 |
| 4,137,950 A * | 2/1979 | Briscall | 138/172 |
| 4,705,468 A * | 11/1987 | LeBreton | 425/116 |
| 5,379,507 A * | 1/1995 | Lindahl | 29/460 |
| 5,384,172 A | 1/1995 | Takado et al. | |
| 5,429,845 A * | 7/1995 | Newhouse et al. | 428/34.1 |
| 5,458,258 A | 10/1995 | White et al. | |
| 5,476,189 A * | 12/1995 | Duvall et al. | 220/590 |
| 5,822,838 A | 10/1998 | Seal et al. | |
| 5,893,961 A * | 4/1999 | Kime et al. | 156/304.2 |
| 6,460,721 B2 | 10/2002 | Bowen et al. | |
| 7,036,677 B1 | 5/2006 | Funck et al. | |
| 7,264,279 B2 * | 9/2007 | Rich et al. | 285/21.1 |
| 2003/0175457 A1 | 9/2003 | Jousse et al. | |
| 2004/0149759 A1 | 8/2004 | Moser et al. | |
| 2004/0173618 A1 * | 9/2004 | Suzuki et al. | 220/581 |
| 2005/0006393 A1 | 1/2005 | Carter | |
| 2005/0006394 A1 * | 1/2005 | Fujihara et al. | 220/581 |
| 2005/0076995 A1 * | 4/2005 | Yasui | 156/148 |

FOREIGN PATENT DOCUMENTS

| | | |
|---|---|---|
| DE | 10246868 A1 | 4/2004 |
| DE | 10360953 A1 | 11/2004 |
| EP | 0635672 A1 | 1/1995 |
| EP | 0911148 A2 | 4/1999 |
| EP | 0911151 A2 | 4/1999 |
| EP | 1108597 A2 | 6/2001 |
| EP | 1555279 A1 | 7/2005 |
| EP | 1623813 A1 | 2/2006 |
| JP | 2004286201 A | 10/2004 |
| WO | WO0127520 A1 | 4/2001 |
| WO | WO03031860 A1 | 4/2003 |
| WO | WO2005093313 A1 | 10/2005 |

OTHER PUBLICATIONS

PCT International Preliminary Report on Patentability dated Sep. 30, 2008 including the Written Opinion form ISA for International Patent Application No. PCT/EP2007/052840 (7 pp.).

Search Report dated Sep. 7, 2006 from European Patent Office for European Patent Application No. EP06113077.9 (6 pp.).

* cited by examiner

METHOD FOR MANUFACTURING AN INNER LINER FOR A STORAGE TANK

CROSS-REFERENCE TO RELATED APPLICATIONS

This application is a U.S. national stage application under 35 U.S.C. §371 of International Application No. PCT/EP2007/052840, filed Mar. 26, 2007, which claims priority to U.S. provisional application 60/786,716 filed Mar. 29, 2006 and further claims priority to European Application No. 06113077.9, filed Apr. 25, 2006, each of these applications being incorporated herein by reference for all purposes.

BACKGROUND OF THE INVENTION

The present invention relates to a method for manufacturing a polymeric inner liner for a storage tank, in particular for a hydrogen storage tank.

Compressed gas is becoming an increasingly popular choice for transportation fuels. As more and more vehicles use compressed gas as fuel, more emphasis needs to be put on the emissions of the fuel systems of such vehicles. Currently, there is a requirement from compressed gas fuel systems that addresses the safety risks of gas permeation from such a system. There is, however, currently no standard that addresses the environmental concerns of compressed gas permeation. When such a standard is introduced, it is likely to be much more restrictive than the current emissions standard.

The vast majority of the compressed gas tanks used on transportation vehicles today is designed to store compressed methane gas (CH4) and is of type III or type IV. There is however, for environmental reasons, a desire to move to compressed hydrogen (H2) as fuel. There are currently no production vehicles being fueled by compressed hydrogen.

Because of the larger molecule size of methane, compared to hydrogen, conventional type II, III and IV tanks meet the current permeation requirements when filled with compressed methane gas. For compressed hydrogen, these conventional tanks do however not necessarily meet the requirements, especially if, as expected, more restrictive requirements are introduced.

Storage tanks have been classified in different categories. Type II tanks concern all steel tanks, which are generally rather heavy and therefore not favored in relation with vehicles. Type III tanks are composite tanks with aluminum liners. These tanks show excellent emission results but are rather expensive. Type IV tanks are composite tanks with polymer liners. Type IV tanks also have very good emission results but, compared to the type III tanks, these tanks have the further advantage of being lighter and less expensive. Therefore, type IV tanks are the most likely candidates for compressed hydrogen storage tanks.

One example of a type IV storage tank is shown in U.S. Pat. No. 5,429,845, which discloses a storage tank comprising a non-metallic inner liner made of plastic or other elastomers and manufactured in one piece by compression molding, blow molding, injection molding or any other generally known technique. The inner liner has a generally cylindrical centre portion and a generally dome-shaped end portion with connections for a metallic communication boss. Another, similar storage tank is disclosed in U.S. Pat. No. 5,476,189, wherein the inner liner has a generally hemispheroidal end section with connections for a metallic communication boss.

It is also know, namely from WO 03/031860, to manufacture a pressure vessel having an outer reinforcing layer and an inner liner comprising hemispherical end caps butt welded on a cylindrical body. This structure has the advantage that metallic connecting parts (namely for fixing a valve allowing the introduction of a fluid under pressure in the container) can easily be over molded by the end caps while the cylindrical body can be obtained by conventional molding techniques. However, such a liner is a monolayer polypropylene one, which leads to bad results in terms of permeability.

It has also been proposed, namely in DE 103 60 953, to use a similar structure (inner liner with outer glass or carbon fiber composite) but with a multilayer liner based on HDPE and EVOH which gives much better results in terms of permeability. However, the method of fabrication of the liner disclosed in that document is rather complicated because the liner is made in one piece by multiple step injection molding.

Combining the teaching of both documents (i.e. choosing a liner having a cylindrical body and welded end caps, but where the cylindrical body is made of a multilayer structure) would provide both an improved method for manufacturing an inner liner for a storage tank and an improved inner liner for getting an improved storage tank.

However, welding of multilayer structures generally lead to connection problems in the welding zone (namely in terms of mechanical performances and permeability).

SUMMARY OF THE INVENTION

The present invention aims at solving that problem and provides a method for manufacturing a polymeric inner liner for a storage tank, in particular for a hydrogen storage tank, the method comprising the steps of:
  providing a cylindrical body made from polymer material and comprising a structural layer and a barrier layer, said cylindrical body having a first open end and a first peripheral connection tab at said open end;
  providing a dome-shaped end cap made from polymer material, the end cap having a base with a cross-section essentially corresponding to a cross-section of the first open end of the cylindrical body and having a second peripheral connection tab at a peripheral end portion of said end cap;
  placing the end cap with its base onto the first open end of the cylindrical body and with said first and second peripheral tabs in contact with each other; and
  welding both connection tabs together.

According to one aspect of the invention, a peripheral end portion of the end cap is provided with a peripheral connection tab for welding to a peripheral connection tab of the open end of the cylindrical body. Such a connection allows limiting the risk of permeability at the connection between the end cap and the cylindrical body and provides a strong mechanical connection.

By "connection tab" is meant an extension of the wall of the cylindrical body and the end cap respectively that allows both parts to be welded to each other on a substantial portion of one of their outer surfaces. Preferably, these tabs are bended inwards so that the external surfaces of both parts are welded together, giving a projection inwards which, through its configuration, gives a strong and impermeable connection.

The dimensions of the welding tab are preferably greater than the wall thickness of the outer shell, as to facilitate the fold over of the material, but sufficiently small enough to ensure that the mechanical properties of the weld are not significantly different than those of the rest of the liner, hereby mitigating the risk of failure due to a stress riser. Welding tabs with a length of at least twice the wall thickness, but not more than 5 or even 4 times the wall thickness of the liner, are a good compromise in that regard.

With such a method, an inner liner with good emission results can be more cost-effectively produced. It is not necessary to use a complex injection molding process to produce the entire inner liner. The conventional blow molding technique, which is well known in the field of regular fuel tanks, can be used for making the cylindrical body. Also, the present method provides an easy and effective solution for manufacturing inner liners of different lengths. Indeed, a dome-shaped end cap can be connected to a cylindrical body of any length to form the completed inner liner. Furthermore, the inner liner according to the present method provides excellent permeation qualities and is suitable in connection with storage tanks for compressed hydrogen. Finally, the end caps may for instance be made by over molding the accessories required for the tank function(s) or by thermoforming existing parts and fixing said accessories (or connecting parts therefore) on these thermoformed parts.

In the method according to the invention, the end cap is preferably also provided with at least one structural layer and at least one barrier layer. In both parts (cylindrical body and end cap), the barrier layer is preferably sandwiched between two structural layers, as it is the case in conventional fuel tanks. The presence of a barrier layer in the entire liner of the invention further increases its permeation performances. As a consequence, a storage tank with an inner liner as manufactured using this preferred embodiment can be used to reduce the emissions from the storage tanks into the atmosphere. It also allows the storage of gasses of smaller molecule size, as e.g. hydrogen.

An adhesive layer can be provided between the structural layer and the barrier layer for bonding the two (or 3) layers. The adhesive layer can be made of any material that is adhesive to both the structural layer and the barrier layer, such as e.g. adhesive modified LDPE for a PE/EVOH configuration as described below.

Preferably, the structural layer comprises polyethylene (PE) or polyamide (PA).

The barrier layer preferably comprises ethylene vinyl alcohol copolymer (EVOH) and can have a thickness of less than 500 µm, possibly even less than 300 µm.

The cylindrical body can have a second open end opposite the first open end and comprising a peripheral connection tab as well, and the method can comprise the further steps of:
  providing a further dome-shaped end cap made from polymer material, the further end cap having a base with a cross-section essentially corresponding to a cross-section of the second open end of the cylindrical body and a peripheral connection tab;
  placing the further end cap with its base onto the second open end of the cylindrical body and with both connection tabs in contact with each other; and
  welding the further end cap onto the second open end of the cylindrical body by welding both connection tabs together.

The invention further concerns an inner liner manufactured according to the above method and a storage tank comprising such an inner liner.

This above described inner liner is indeed generally combined with an outer shell to provide a storage tank. The nature of the outer shell is any structure suitable for containing at least 10 bar of pressure. This can come in the form of a metallic structure or more preferably, a carbon fiber filament composite wound around the outside of the liner, and then, preferably, wound with a layer of a more impact resistant material. Preferably, the liner and the outer shell are coaxially adjacent to each other and, besides the mechanical constraint of the outer shell on the inner liner, the two are not connected and expand and contract at different rates.

As already explained above, at least one end cap of the tank (liner) is provided with a connection part (communication boss) allowing connection of an accessory (valve for instance) to the storage tank. This part preferably is a metallic part. It may be over molded with the end cap of the liner in the case the latter is injection molded. Alternatively, this part may be a separate part put on top of the end cap of the liner before wounding the carbon filament composite around the liner. This embodiment is preferred especially when the end cap is obtained by thermoforming. In that case, the outer surface of the end cap of the liner and the lower surface of the connection part are preferably provided with a corresponding relief (for instance: grooves and ridges) that prevents the connection part from rotating while winding the fiber composite layer.

Finally, the present invention also concerns the use of a tank as described above for storing hydrogen.

Further aspects of the invention may become apparent by referring to the detailed description of a preferred embodiment.

BRIEF DESCRIPTION OF THE DRAWINGS

The drawings form an integral part of the specification and are to be read in conjunction therewith. The detailed description of the invention is a non-limiting description of one preferred embodiment of the invention.

DETAILED DESCRIPTION OF THE INVENTION

Figure 1:
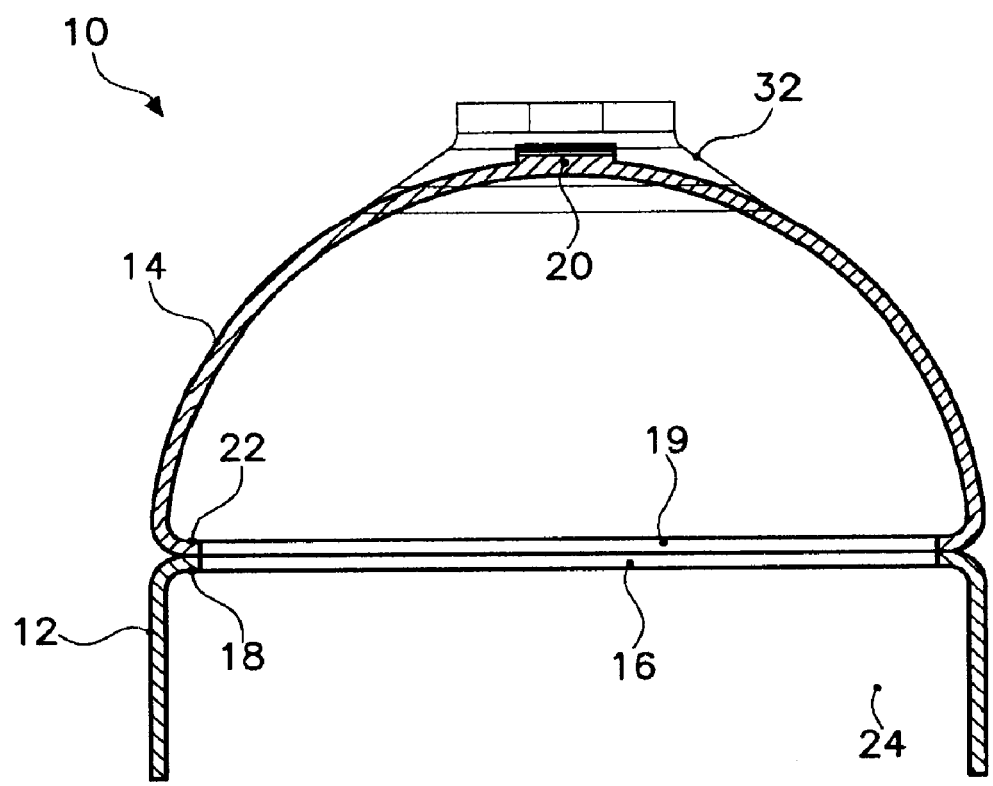
FIG. 1: is a schematic illustration of a top section of a polymeric inner liner manufactured in accordance with the principles of the present invention.

Referring to FIG. 1, a top section of a polymeric inner liner is indicated generally at 10 and comprises a cylindrical body 12, a first end of which is shown in FIG. 1, and a dome-shaped end cap 14.

The cylindrical body 12 comprises a first open end 16 and comprises a first peripheral connection tab 18.

The end cap 14 has a base and an apex, wherein the base has a second open end 19 and the apex has a communication opening 20 for forming a communication between the inner chamber of the storage tank and the exterior of the storage tank. The end cap 14 comprises, at its base, a second peripheral connection tab 22.

The peripheral connection tabs 18, 22 are arranged in such a way that, when the end cap 14 is placed on the first end of the cylindrical body 12, the peripheral connection tabs 18, 22 are in alignment and can be connected by welding. Once welded together, the cylindrical body 12 and the end cap 14 form an inner chamber 24 wherein compressed gas can be stored.

Due to the peripheral connection tabs 18, 22 the risk of gas leaking through the inner liner 10 at the connection between the cylindrical body 12 and the end cap 14 is reduced.

Figure 2:
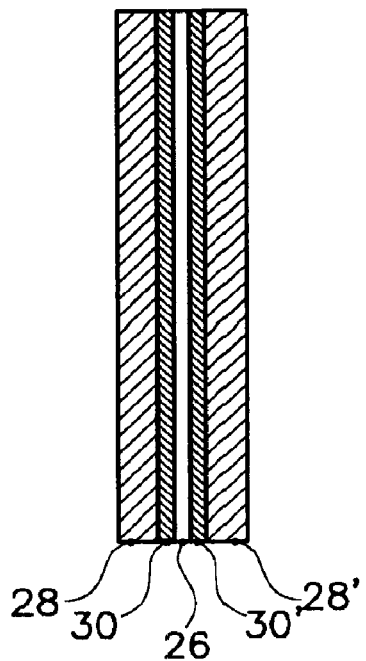
FIG. 2: is a cut view through the inner liner according to a first aspect of the invention.
Figure 3:
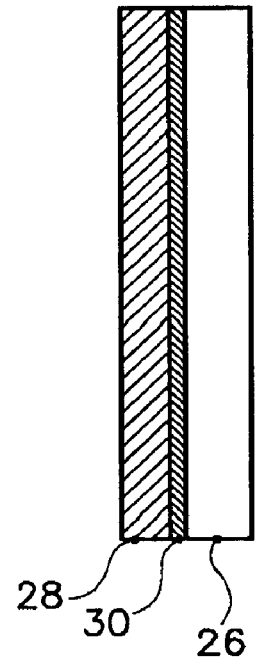
FIG. 3: is a cut view through the inner liner according to a second aspect of the invention.
Figure 4:
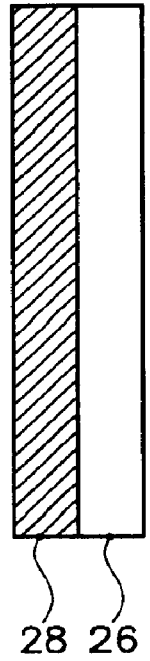
FIG. 4: is a cut view through the inner liner according to a third aspect of the invention.

The inner liner 10 shown in FIG. 2 comprises a barrier layer 26 sandwiched between a first and a second structural layer 28, 28' with adhesive layers 30, 30' arranged between the barrier layer 26 and the structural layers 28, 28'. The inner liner 10 shown in FIG. 3 comprises a barrier layer 26 connected to a structural layer 28 via an adhesive layer 30. The inner liner 10 shown in FIG. 4 comprises a barrier layer 26 directly connected to a structural layer 28.

The structural layer 28, 28' can be made of PE and can have a thickness in the range between 1 and 8 mm. Another material that could e.g. be used for the structural layer is PA. The barrier layer 26 can be made of EVOH and can have a thickness in the range between 50 and 500 µm. The adhesive layer 30, 30' can have a thickness in the range between 50 and 500 µm. The adhesive layer 30, 30' can be made of any material that is adhesive to both the structural layer and the barrier layer, such as e.g. adhesive modified LDPE for the above PE/EVOH configuration. The overall thickness of the inner liner 10 is in the range between 2 and 17 mm.

Returning to FIG. 1, the communication opening 20 in the apex of the end cap 14 cooperates with a metallic communication boss, schematically indicated and generally referred to by reference number 32, to create a communication passage between the interior of the storage tank and the exterior thereof. A valve (not shown) is generally installed in this communication passage. Through the communication passage, compressed gas can be fed into the storage tank and released therefrom.

Figure 5:
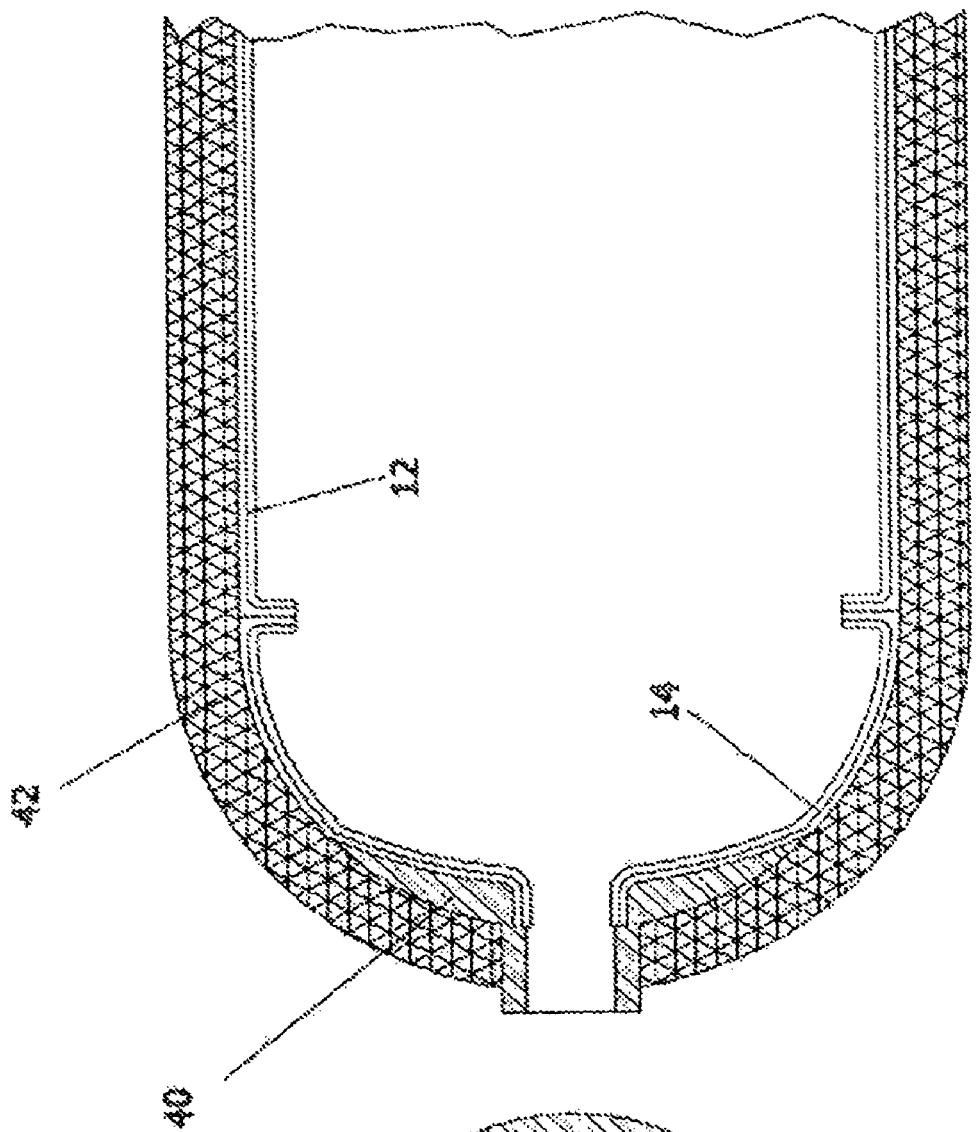
FIG. 5: is a detailed view of a metallic communication boss according to a preferred embodiment of the invention, and of the way it is encapsulated into a tank according to the invention.
Figure 6:
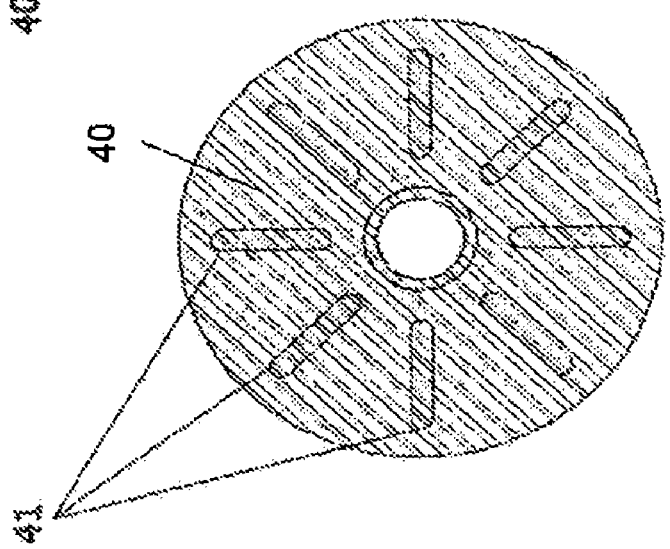
FIG. 6: is an end cross-sectional view of the metallic communication boss shown in FIG. 5.

FIGS. 5 and 6 show a metallic communication boss 40 having grooves 41 that interlock with corresponding ridges (not shown) on the end cap 14 of the liner. These grooves 41 prevent the rotation of said boss 40 when a composite fiber outer shell 42 is wound around the liner and hence, allow said boss 40 to merely rest (without fixation) on top of the end cap 14 during the winding.

While specific embodiments have been shown and described in detail to illustrate the principles of the present invention, it will be understood that the invention may be embodied otherwise without departing from such principles. For example, one skilled in the art will readily recognize from the above discussion and from the accompanying drawings and claims that various changes, modifications and variations can be made without departing from the spirit and scope of the invention as described in the following claims.

REFERENCE NUMBERS 10 polymeric inner liner
12 cylindrical body
14 dome-shaped end cap
16 first open end
18 first peripheral connection tab
19 second open end
20 communication opening
22 second peripheral connection tab
24 inner chamber
26 barrier layer
28 first structural layer
28' second structural layer
30 adhesive layer
30' adhesive layer
32 schematic view of the metallic communication boss
40 detail of the metallic communication boss
41 grooves on said boss
42 outer shell

The invention claimed is:

1. A method for manufacturing a polymeric inner liner for a storage tank, in particular for a hydrogen storage tank, the method comprising the steps of:
   providing a cylindrical body made from polymer material, the cylindrical body including a structural layer and a barrier layer, and said cylindrical body having a first open end and a first peripheral connection tab at said first open end;
   providing a dome-shaped end cap made from polymer material, the end cap including a base with a cross-section that substantially corresponds to a cross-section of the first open end of the cylindrical body, and a second peripheral connection tab at a peripheral end portion of said end cap;
   placing the base of the end cap onto the first open end of the cylindrical body such that said first and second peripheral connection tabs contact each other; and
   welding the first and second peripheral connection tabs together, wherein the first and second peripheral connection tabs are bent inwards so that external surfaces of the cylindrical body and of the end cap are welded together.

2. The method according to claim 1, wherein a length of the first and second peripheral connection tabs is greater than a wall thickness of the liner and is not more than 5 times the wall thickness of the liner.

3. The method according to claim 1, wherein the cylindrical body is blow molded.

4. The method according to claim 1, wherein the end cap is formed either by over molding accessories required for one or more tank functions, or thermoforming existing parts and fixing the accessories on the thermoformed parts.

5. The method according to claim 1, wherein the barrier layer comprises an ethylene vinyl alcohol copolymer (EVOH) and has a thickness of less than 500 µm.

6. A method for manufacturing a storage tank including a liner manufactured by the method of claim 1, the method for manufacturing a storage tank comprising the steps of:
   winding a carbon fiber filament composites around an outside of the liner to create at least part of an outer shell.

7. The method according to claim 6, wherein the liner and the outer shell are coaxially adjacent to each other, and
   wherein the liner and the outer shell are independent of each other thereby allowing the liner and the outer shell to expand and to contract at different rates, respectively.

8. The method according to claim 6, further comprising:
   providing the tank with a connection part configured to connect an accessory to the tank,
   wherein the connection part is a separate part put on a top of the end cap of the liner before winding the carbon fiber filament composite around the liner, and
   wherein an outer surface of the end cap of the liner includes ridges that correspond to grooves on a lower surface of the connection part so as to prevent the connection part from rotating while winding the fiber composite.

9. A method for storing hydrogen comprising:
   storing hydrogen in the storage tank manufactured by the method of claim 1.

10. A method for manufacturing a polymeric inner liner for a storage tank, in particular for a hydrogen storage tank, the method comprising the steps of:
   providing a cylindrical body having a wall that includes a structural layer and a barrier layer, the cylindrical body including a first open end and a first peripheral connection flange disposed at the first open end, the first peripheral connection flange being an angular extension of the wall of the cylindrical body;

providing a dome-shaped end cap that includes a base having a cross-section that substantially corresponds to a cross-section of the first open end of the cylindrical body, a second peripheral connection flange disposed at a peripheral end portion of the end cap, the second peripheral connection flange being an angular extension of a wall of the end cap;

placing the base of the end cap onto the first open end of the cylindrical body such that the first and second peripheral connection flanges contact each other; and welding the first and second peripheral connection flanges together wherein the first and second peripheral connection flanges project inwardly from the walls of the cylindrical body and the end cap, respectively.

11. The method according to claim 10, wherein the first peripheral connection flange projects perpendicularly inward with respect to an external side surface of the wall of the cylindrical body, and wherein the second peripheral connection flange projects angularly from a slope of the wall of the end cap such that an external surface of the second peripheral connection flange is parallel with an external surface of the first peripheral connection flange.

12. The method according to claim 10, wherein the first connection flange projects inwardly from an entire perimeter of the wall of the cylindrical body at the first open end of the cylindrical body, and wherein the second peripheral connection flange projects inwardly from an entire perimeter of the wall at the peripheral end portion of the end cap.

13. The method according to claim 12, wherein the first peripheral connection flange projects perpendicularly inward with respect to an external side surface of the wall of the cylindrical body, and wherein the second peripheral connection flange projects angularly from a slope of the wall of the end cap such that an external surface of the second peripheral connection flange is parallel with an external surface of the first peripheral connection flange.

* * * * *